United States Patent [19]

Wada et al.

[11] Patent Number: 5,310,709

[45] Date of Patent: * May 10, 1994

[54] PRODUCTION OF NONREDUCIBLE DIELECTRIC CERAMIC COMPOSITION

[75] Inventors: Nobuyuki Wada, Shiga; Yoshiaki Kohno, Moriyama, both of Japan

[73] Assignee: Murata Manufacturing Co., Ltd., Japan

[*] Notice: The portion of the term of this patent subsequent to Aug. 3, 2010 has been disclaimed.

[21] Appl. No.: 836,089

[22] Filed: Feb. 14, 1992

[30] Foreign Application Priority Data

Feb. 16, 1991 [JP] Japan .................................. 3-44399

[51] Int. Cl.$^5$ .............................................. C04B 35/46
[52] U.S. Cl. ................................... 501/134; 501/135; 501/136; 501/137; 501/138; 501/139; 501/152; 423/263; 423/598
[58] Field of Search ............... 501/134, 135, 136, 137, 501/138, 139, 152; 252/520, 521; 423/263, 598

[56] References Cited

U.S. PATENT DOCUMENTS

| | | | |
|---|---|---|---|
| 3,997,479 | 12/1976 | Shimojo et al. | 252/520 |
| 4,535,064 | 8/1985 | Yoneda | 501/138 |
| 4,537,865 | 8/1985 | Okabe et al. | 501/135 |
| 4,677,083 | 1/1987 | Uedaira et al. | 423/598 |
| 4,987,107 | 1/1991 | Narumi et al. | 501/137 |

*Primary Examiner*—Karl Group
*Assistant Examiner*—Michael Marcheschi
*Attorney, Agent, or Firm*—Ostrolenk, Faber, Gerb & Soffen

[57] ABSTRACT

A nonreducible dielectric ceramic composition of a system, $(A_{1-x}R_x)_yBO_3$, is produced using using at least one compound selected from the group consisting of water-soluble inorganic compounds and organic solvent-soluble organometallic compounds of rare earth element R together with oxides and/or carbonates of elements A and B.

7 Claims, No Drawings

PRODUCTION OF NONREDUCIBLE DIELECTRIC CERAMIC COMPOSITION

BACKGROUND OF THE INVENTION

1. Field of the Invention

The present invention relates to a method for production of nonreducible dielectric ceramic composition and, more particularly, a method for production of a nonreducible ceramic composition used as a dielectric material for monolithic ceramic capacitors for example.

2. Description of the Prior Art

In general, monolithic ceramic capacitor are produced by a process comprising the steps of preparing ceramic green sheets, forming an internal electrode layer on each green sheet, stacking the green sheets to form a monolithic multilayer body, cutting it into green capacitor chips, firing them in a suitable atmosphere and then forming external electrodes on opposite sides of the resultant capacitor chips.

As a dielectric material for such monolithic ceramic capacitors, there have been used dielectric ceramic compositions of barium titanate modified with zirconates and titanates of alkaline earth metals. Since these dielectric ceramic materials of the prior art are generally reduced to semiconductors when fired in a neutral or reducing atmosphere with a low-oxygen partial pressure, they must be fired in an oxidizing atmosphere.

These conditions require use of an internal electrode material which does not melt at sintering temperature of the dielectric ceramic material and which does not oxidize even in an atmosphere with a high-oxygen partial pressure. For this reason, noble metals such as palladium or platinum have been used as a material for internal electrodes. However, the use of noble metals has resulted in the increase in the cost of monolithic ceramic capacitors as the noble metals are expensive. In addition, there is an increasing demand for monolithic ceramic capacitors which are small in size but large in capacitance. Thus, the cost occupied by internal electrodes increases with decrease in size of monolithic ceramic capacitor.

To solve these problems, it has been proposed to use inexpensive base metals such as nickel as a material for internal electrodes. However, these base metals are easily oxidized in the sintering atmosphere with a high partial pressure of oxygen. Thus, in order to prevent internal electrodes from oxidation during sintering, it is required to use a nonreducible dielectric ceramic material which is not semiconductorized even if fired in a neutral or reducing atmosphere with a low partial pressure of oxygen and which possesses high insulating resistance and excellent dielectric properties enough to use it as a dielectric material for capacitors.

JP-B H2-63664 discloses a nonreducible dielectric ceramic composition composed of a solid solution of barium titanate containing a rare earth element such as Ce. This composition is very useful as a dielectric material for monolithic ceramic capacitors because of its high dielectric constant and high resistance to reduction. Such a dielectric ceramic material has generally been produced by mixing carbonates and/or oxides of the respective components in given molar ratios and then calcining the mixture in air. It is, however, difficult with such a process to prepare raw materials having grain size of not more than 1 μm. If raw materials with large grains size are mixed and calcined to prepare a dielectric ceramic composition, the concentration of the rare earth element varies with place to place because of its nonuniform diffusion, thus making it difficult to produce a dielectric ceramic material with a uniform composition. If such a dielectric ceramic material is fired in a reducing atmosphere, it is partially semiconductorized in the regions where the concentration of the rare earth element is increased. For these reasons, the use of such a dielectric ceramic material results in decrease in the reliability of the monolithic capacitors.

SUMMARY OF THE INVENTION

It is therefore an object of the present invention to provide a method for producing nonreducible dielectric ceramic compositions which make it possible to manufacture monolithic ceramic capacitors with high reliability.

According to the present invention there is provided a method for production of nonreducible dielectric ceramic compositions of a perovskite structure expressed by the general formula:

$$(A_{1-x}R_x)_y BO_3$$

wherein A is at least one element selected from the group consisting of Ba, Sr, Ca and Mg, R is at least one rare earth element, and B is at least one element selected from the group consisting of Ti, Zr and Sn, x and y take a value in the following respective ranges: $0.001 \leq x \leq 0.020$, $1.002 \leq y \leq 1.03$, characterized in that said composition is produced using at least one compound selected from the group consisting of water-soluble inorganic compounds and organic solvent-soluble organometallic compounds of rare earth element R.

More particularly, the method of the present invention comprises the steps of (a) mixing at least one compound of element A selected from the group consisting of carbonates and oxides of element A and at least one compound of element B selected from the group consisting of oxides and carbonates of element B, (b) adding at least one compound of rare earth element R to the resultant mixture, and (c) calcining the resultant mixture in an oxidizing atmosphere, and is characterized by the fact that the above at least one compound of rare earth element is the one selected from the group consisting of water-soluble inorganic compounds and organic solvent-soluble organometallic compounds of rare earth elements.

In a preferred embodiment, at least one compound of rare earth element R is added together with a suitable solvent to the mixture of at least one compound of element A and at least one compound of element B. At least one compound of rare earth element may be added to at least one compound of element A together with at least one compound of element B and a suitable solvent.

In another preferred embodiment, the mixture of at least one compound of element A and at least one compound of element B is milled together with a suitable amount of a solvent, dried and then calcined before addition of at least one compound of rare earth element R.

Typical water soluble inorganic compounds of rare earth element are inorganic acid salts of rare earth element such as, for example, chlorides, nitrates, sulphates, phosphates and carbonates. Any of the above inorganic acid salts may be used in the process of the present invention. As an organometallic compound of rare earth element, there may be used those such as trisacetylacetonatocerium [Ce(C$_5$H$_7$O$_2$)$_3$], trisacetylacetonatoneodymium [Nd(C$_5$H$_7$O$_2$)$_3$], trisacetylacetonatosamarium [Sm(C$_5$H$_7$)$_2$)$_3$], and the like.

If rare earth element R is used in the form of a water soluble inorganic compound, it is preferred to use water as a solvent. However, if organometallic compounds are used as the source of rare earth element, it is preferred to use organic solvents such as alcohols, acetone, benzene, ethers, etc.

The reasons why the dielectric ceramic composition has been limited to those having the compositional proportions defined as above are as follows. If x, i.e., a mole fraction of the rare earth element in the ($A_{1-x}R_x$) site, is less than 0.001, the reliability is scarcely improved by addition of the rare earth element. If x exceeds 0.02, the reliability becomes lowered. If y, i.e., the molar ratio of ($A_{1-x}R_x$) site to B site, is less than 1.002, the composition is apt to be semiconductorized and is considerably lowered in the reliability. If y exceeds 1.03, the sintering property becomes lowered.

According to the present invention, it is possible to produce a dielectric ceramic composition of a perovskite structure with uniform concentration of rare earth element, thus making it possible to produce monolithic ceramic capacitors with high reliability. Also, it is possible to reduce the thickness of dielectric ceramic layers of the monolithic ceramic capacitors, which in turn makes it possible to produce small-sized, large capacitance monolithic ceramic capacitors.

Since the dielectric ceramic composition produced by the method of the present invention is scarcely reduced even in a reducing atmosphere, it is possible to use inexpensive base metals as a material for internal electrodes, thus making it possible to reduce the cost of the monolithic ceramic capacitors.

The monolithic ceramic capacitors employing the dielectric ceramic composition of the present invention have the mean time to failure which is increased by more than 10 times that of the capacitors produced by the conventional method.

The above and other objects, features and advantages of the present invention will become apparent from the following description in connection with several examples.

EXAMPLE 1

Raw materials, BaCO$_3$, SrCO$_3$, CaCO$_3$, TiO$_2$ and ZrO$_2$, each having the purity of not less than 99.8%, were weighed and mixed in molar ratios shown in Table 1 to prepare 1500 g of a mixture. The resultant mixture was placed in a resin pot along with 3000 ml of pure water and 1 mol % of CeCl$_3$ and milled for 16 hours with 5000 g of zirconia balls of a diameter of 5 mm. The resultant slurry was dried by evaporation, calcined at 1100° C. for 2 hours and then crushed to prepare calcined powder of a dielectric ceramic composition containing Ce uniformly distributed therein.

TABLE 1

| BaCO$_3$ | SrCO$_3$ | CaCO$_3$ | TiO$_2$ | ZrO$_2$ |
|---|---|---|---|---|
| 0.81 | 0.10 | 0.10 | 0.90 | 0.10 |

Using the resultant calcined powder, there were prepared monolithic ceramic capacitors in the following manner. The calcined powder (200 parts by weight) was placed in a resin pot together with a suitable amount of an organic binder and a suitable amount of an organic solvent, and then milled for 10 hours with 2000 g of zirconia balls of a diameter of 5 mm. The resultant slurry was made into a sheet by the Doctor blade, dried and then cut to prepare ceramic green sheets of a 15 μm thickness.

Each ceramic green sheet was provided on its one surface with a conductive layer of Ni paste for internal electrodes by the screen printing process. Subsequently, 10 sheets of the printed green sheets were stacked, pressed and then cut to prepare green chips for monolithic ceramic capacitors. The green chips were heated to and maintained at 300° C. for 2 hours in an atmosphere with a partial pressure of oxygen of 100 ppm to remove the binder, and then fired at 1250° to 1300° C. for 2 hours in a reducing atmosphere with a controlled oxygen pressure of $3 \times 10^{-8}$ to $3 \times 10^{-10}$ atm to prepare monolithic capacitor chips. External electrodes were formed on opposite sides of the monolithic capacitor chips in the conventional manner to prepare specimens.

For specimens, the measurements were made on capacitance, dielectric loss (tan δ), insulating resistance (IR) and mean time to failure (MTTF). Capacitance and dielectric loss (tan δ) were measured at 25° C. by applying an AC voltage of 1 KHz and 1 Vrms to the specimen. Dielectric constant (ε) was calculated from the measured capacitance, a surface area of the internal electrodes and a distance between neighboring two internal electrodes. The value of MTTF was measured by applying a DC voltage of 64V/10μm at 150° C. The insulating resistance is determined as a logarithmic value (log IR). Results are as follows:

| | |
|---|---|
| Capacitance: | 78 nF |
| ε: | 11500 |
| tan δ: | 1.5% |
| log IR: | 11.2 |
| MTTF: | 19.8 hr |

EXAMPLE 2

Raw materials each having the purity of not less than 99.8% were weighed and mixed in molar ratios shown in Table 2 to prepare 1500 g of a mixture. The mixture was placed in a resin pot along with 3000 ml of pure water and milled for 16 hours with 5000 g of zirconia balls of a diameter of 5 mm. The resultant slurry was dried by evaporation and calcined at 1150° C. for 2 hours. The resultant calcined powder (1000g) was then placed in a resin pot and milled together with 2000 ml of pure water, 3.0 g (effective components) of a surface active agent and 0.5 mol % of Sm(NO$_3$)$_3$·6H$_2$O for 16 hours with 5000 g of zirconia balls of a diameter of 5 mm. The resultant slurry was dried by evaporation and then calcined at 1150° C. for 2 hours to prepare calcined powder of a dielectric ceramic composition containing Sm.

TABLE 2

| BaCO$_3$ | SrCO$_3$ | TiO$_2$ | ZrO$_2$ |
|---|---|---|---|
| 0.605 | 0.40 | 0.97 | 0.03 |

Using the calcined power, specimens of monolithic capacitors were prepared in the same manner as Example 1 and their electric properties were measured in the same manner as Example 1. Results are as follows:

| | |
|---|---|
| Capacitance: | 80 nF |

| | |
|---|---|
| ε: | 12000 |
| tan δ: | 4.5% |
| log IR: | 10.8 |
| MTTF: | 15.2 hr |

EXAMPLE 3

Raw materials each having the purity of not less than 99.8% were weighed and mixed in molar ratios shown in Table 3 to prepare 1500 g of a mixture. The resultant mixture was placed in a resin pot along with 3000 ml of pure water and milled for 16 hours with 5000 g of zirconia balls of a diameter of 5 mm. The resultant slurry was dried by evaporation and calcined at 1150° C. for 2 hours to prepare calcined powder of a ceramic composition of a system $(Ba_{0.89}Mg_{0.01}Ca_{0.10})_{1.01}(Ti_{0.85}Zr_{0.15})O_3$.

TABLE 3

| $BaCO_3$ | $MgCO_3$ | $CaCO_3$ | $TiO_2$ | $ZrO_2$ |
|---|---|---|---|---|
| 0.90 | 0.01 | 0.10 | 0.85 | 0.15 |

The calcined powder (200g) was placed in a resin pot along with 1.5 mol% of $Nd(CH_3COCHCOCH_3)_3$, a suitable amount of an organic binder and a suitable amount of an organic solvent, and then milled for 10 hours with 2000 g of zirconia balls of a diameter of 5 mm to prepare a slurry. The resultant slurry was formed into a sheet by the Doctor blade, dried and then cut to prepare ceramic green sheets of a 15 μm thickness. Using the ceramic green sheets, there were prepared specimens of monolithic capacitors in the same manner as Example 1. The electric properties of the specimen were measured in the same manner as Example 1. Results are as follows:

| | |
|---|---|
| Capacitance: | 84 nF |
| ε: | 12200 |
| tan δ: | 2.5% |
| log IR: | 11.3 |
| MTTF: | 27.5 hr |

COMPARATIVE EXAMPLE 1

Raw materials, $BaCO_3$, $SrCO_3$, $CaCO_3$, $TiO_2$ and $ZrO_2$, each having the purity of not less than 99.8%, were weighed and mixed in the same molar ratios as those shown in Table 1 to prepare 1500 g of a mixture. The resultant mixture was placed in a resin pot along with 3000 ml of pure water and 1 mol % of $CeO_2$ and then milled for 16 hours with 5000 g of zirconia balls of a diameter of 5 mm. The resultant slurry was dried by evaporation, calcined at 1100° C. for 2 hours and then crushed to prepare calcined powder of a dielectric ceramic composition containing Ce.

Using the calcined power, there were prepared specimens of monolithic capacitors in the same manner as Example 1 and the electric properties of specimens were measured in the same manner as Example 1. Results are as follows:

| | |
|---|---|
| Capacitance: | 85 nF |
| ε: | 13000 |
| tan δ: | 4.8% |
| log IR: | 10.6 |
| MTTF: | 1.2 hr |

As can be seen from data for Examples 1 to 3, MTTF of the dielectric ceramic compositions produced by the method of the present invention ranges from 15.2 to 27.5 hours, whereas that of the comparative specimen produced by the conventional method is very short and of the order of 1.3 hours.

What is claimed is:

1. A method for production of nonreducible dielectric ceramic composition of a perovskite structure expressed by the general formula:

$$(A_{1-x}R_x)_yBO_3$$

wherein A is at least one element selected from the group consisting of Ba, Sr, Ca and Mg, R is at least one rare earth element, B is at least one element selected from the group consisting of Ti, Zr and Sn, and x and y take respective values in the following ranges: $0.001 \leq x \leq 0.020$, and $1.002 \leq y \leq 1.03$, said method comprising the steps of (a) mixing at least one compound of element A selected from the group consisting of carbonates and oxides of element A, at least one compound of element B selected from the group consisting of oxides and carbonates of element B; and at least one compound of rare earth element R, so that a molar ratio of $(A_{1-x}R_x)$-site to B-site is not less than 1.002 but not more than 1.03, said at least one compound of rare earth element R being selected from the group consisting of water-soluble inorganic compounds and organic-solvent-soluble organometallic compounds;

(b) milling the resultant mixture together with a suitable amount of a solvent; and (c) calcining the resultant mixture in an oxidizing atmosphere.

2. The method claimed in claim 1 wherein said at least one compound of rare earth element R is at least one organic-solvent-soluble organometallic compound selected from the group consisting of trisacetylacetonatocerium, trisacetylacetonatoneodymium and trisacetylacetonatosamarium.

3. The method claimed in claim 1 wherein said at least one compound of element A and at least one compound of element B are mixed, milled together with a suitable amount of a solvent, and then calcined before addition of said at least one compound of rare earth element R.

4. The method claimed in claim 1 wherein said at least one compound of rare earth element R is at least one water-soluble inorganic acid salt of a rare earth element selected from the group consisting of chlorides, nitrates, sulphates, phosphates and carbonates.

5. A method for production of nonreducible dielectric ceramic compositions of a perovskite structure expressed by the general formula:

$$(A_{1-x}R_x)_yBO_3$$

wherein A is at least one element selected from the group consisting of Ba, Sr, Ca and Mg, R is at least one rare earth element, B is at least one element selected from the group consisting of Ti, Zr and Sn, and x and y take respective values in the following ranges: $0.001 \leq x \leq 0.020$, and $1.002 \leq y \leq 1.03$, said method comprising the steps of mixing at least one compound of element A selected from the group consisting of carbonates and oxides of element A, at least one compound of element B selected from the group consisting of oxides and carbonates of element B, and at least one compound of rare earth element R; and calcining the resultant mixture in an oxidizing atmosphere;

said at least one compound of rare earth element R being selected from the group consisting of water-soluble inorganic compounds and organic-solvent-soluble organometallic compounds; said organometallic compounds being trisacetylacetonatocerium, trisacetylacetonatoneodymium, and trisacetylacetonatosamarium.

6. The method claimed in claim 1, further comprising the step of forming a monolithic ceramic capacitor comprising a plurality of dielectric layers, and internal electrode layers sandwiched between respective pairs of said dielectric layers, said dielectric layers consisting essentially of said nonreducible dielectric ceramic composition.

7. The method claimed in claim 6, wherein said internal electrode layers consist essentially of a base metal.

* * * * *